United States Patent [19]

Sauter

[11] 3,715,653
[45] Feb. 6, 1973

[54] WELL LOGGING METHODS AND APPARATUS FOR CONVERTING SPATIAL DERIVATIVE MEASUREMENTS TO TIME DERIVATIVE MEASUREMENTS

[75] Inventor: William D. Sauter, Sherman, Conn.

[73] Assignee: Schlumberger Technology Corporation, New York, N.Y.

[22] Filed: Jan. 4, 1971

[21] Appl. No.: 103,449

[52] U.S. Cl. .................... 324/1, 324/10, 340/18 DC
[51] Int. Cl. .............................................. G01v 3/18
[58] Field of Search ............ 324/1, 8, 10; 340/18 DC; 33/133

[56] References Cited

UNITED STATES PATENTS

| | | | |
|---|---|---|---|
| 3,488,658 | 1/1970 | Tanguy | 340/18 DC |
| 3,497,958 | 3/1970 | Gollwitzer | 33/133 |
| 3,360,774 | 12/1967 | Smith et al. | 340/18 DC |
| 3,402,348 | 9/1968 | Hoehn et al. | 324/8 |
| 3,268,801 | 8/1966 | Clements et al. | 324/10 |

*Primary Examiner*—Gerard R. Strecker
*Attorney*—Stewart F. Moore, Jerry M. Presson, Edward M. Roney, William R. Sherman, David L. Moseley, Michael J. Berger, James C. Kesterson and Ernest R. Archambeau

[57] ABSTRACT

In accordance with illustrative embodiments of the present invention, a technique is disclosed for converting a spatial derivative well logging measurement to a time derivative one. Pulses having a rate representative of the velocity of the electrode are used in converting the spatial derivative to a time derivative. This is accomplished in connection with a system which combines a measurement of the difference between the potentials at electrodes in a borehole and at the surface of the earth with a measurement of the gradient or spatial derivative of the potential at the electrode in the borehole to produce a compensated measure of the spontaneous potential.

6 Claims, 5 Drawing Figures

INVENTOR.
William D. Sauter

WELL LOGGING METHODS AND APPARATUS FOR CONVERTING SPATIAL DERIVATIVE MEASUREMENTS TO TIME DERIVATIVE MEASUREMENT

This invention relates to well logging methods and apparatus and more specifically to methods and apparatus for converting a spatial derivative to a time derivative.

A spatial derivative can be defined as the rate of change of a function ($F$) with distance $Z$, i.e., $d(F)/dZ$, and the time derivative is the rate of change of the function with time $t$, i.e., $d(F)/dt$. One important example of where it is desirable to convert a spatial derivative to a time derivative can be found in copending application Ser. No. 881,793 filed by N. A. Schuster on Dec. 3, 1969, and now U.S. Pat. No. 3,638,105 dated Jan. 25, 1972. This Schuster application describes, among other things, a technique for compensating the usual spontaneous potential measurement of noise.

The spontaneous potential, or self potential, hereinafter called SP, is the potential produced naturally by electrochemical phenomena in the formations. This electrochemical phenomena causes electromotive forces to be produced at the contacts between the drilling mud or its filtrate and the formation water in the pores of the permeable beds and across the adjacent shales. In the typical SP logging method, the potential is measured between a surface reference electrode and an electrode in the column of conductive mud as this latter electrode is pulled up past different formations. The character of the SP log produced by such measurements depends a great deal upon the mud and the formations encountered and is used to detect permeable beds and obtain values of formation water resistivity.

While systems for measuring the SP have proved generally satisfactory in the past, there are unfortunately a number of factors which can cause errors to be introduced into the usual SP measurement when utilizing the usual measuring systems. For example, magnetism noise is many times induced into the SP wire which is connected to the reference electrode at the surface of the earth by a magnetic field of a magnetized moving part of the reeling mechanism which pays out or takes in the cable at the surface of the earth. Additionally, stray currents from such sources, motors and generators at the surface of the earth, or telluric currents, affect the usual SP measurement.

In addition to noise affecting the surface SP electrode, there are also a number of sources of noise which affect the downhole SP electrode. One such cause of this noise is the bimetallism noise caused by currents in the formation and mud column generated by a voltaic cell between dissimilar metals of the downhole logging apparatus. Additionally, noise produced by polarization of the downhole SP electrode causes the potential of this electrode to vary in an undesirable manner. However, the magnitude of this polarization noise is usually so low as to be unimportant. The polarization noise is primarily a DC or base line drift type noise and the other previously mentioned noises are primarily AC or high frequency type noises.

These problems have been substantially overcome by utilizing a technique which extracts the low frequency component of the usual SP measurement (between the downhole SP electrode and the surface of the earth) and extracts the high frequency component of a substantially integrated differential or gradient SP. These two components are then combined to produce a substantially true SP having good low and high frequency content. Such a technique is disclosed in the copending Schuster application.

When using such a technique with circuits which operate as a function of time, the gradient SP measurement, which is proportional to $dV/dZ$ where $V$ is the potential and $Z$ the distance, should be converted from a spatial derivative $dV/dZ$ to a time derivative $dV/dt$.

In presently used logging systems, an incremental depth pulse generator is responsive to movement of the cable at the surface of the earth for generating depth pulses at a rate dependent on the velocity of the cable. For example, see U.S. Pat. No. 3,497,958 granted to L. H. Gollwitzer on Mar. 3, 1970 and assigned to the same assignee as the present invention. This Gollwitzer patent discloses apparatus for generating such incremental depth pulses and correcting them for cable stretch, temperature, and the like. It would be desirable to use such depth pulses (corrected or uncorrected) to convert a spatial derivative to a time derivative.

It is therefore an object of the present invention to provide new and improved methods and apparatus for converting a spatial derivative well logging measurement to a time derivative one.

It is another object of the present invention to provide such a conversion in a spontaneous potential measuring system.

In accordance with the methods and apparatus of the present invention, a cable supported support member adapted for movement through a borehole carries apparatus for measuring the spatial derivative of a subsurface characteristic to enable a spatial derivative signal to be produced. Depth pulses having a time characteristic dependent on the velocity of the cable are generated in response to the movement of the cable and are used to convert the spatial derivative signal to a time derivative signal.

For a better understanding of the present invention, together with other and further objects thereof, reference is had to the following description taken in connection with the accompanying drawings, the scope of the invention being pointed out in the appended claims.

Referring to the drawings.

The spatial derivative to time derivative conversion scheme of the present invention will be described in connection with a spontaneous potential measuring system.

Figures 1, 2:
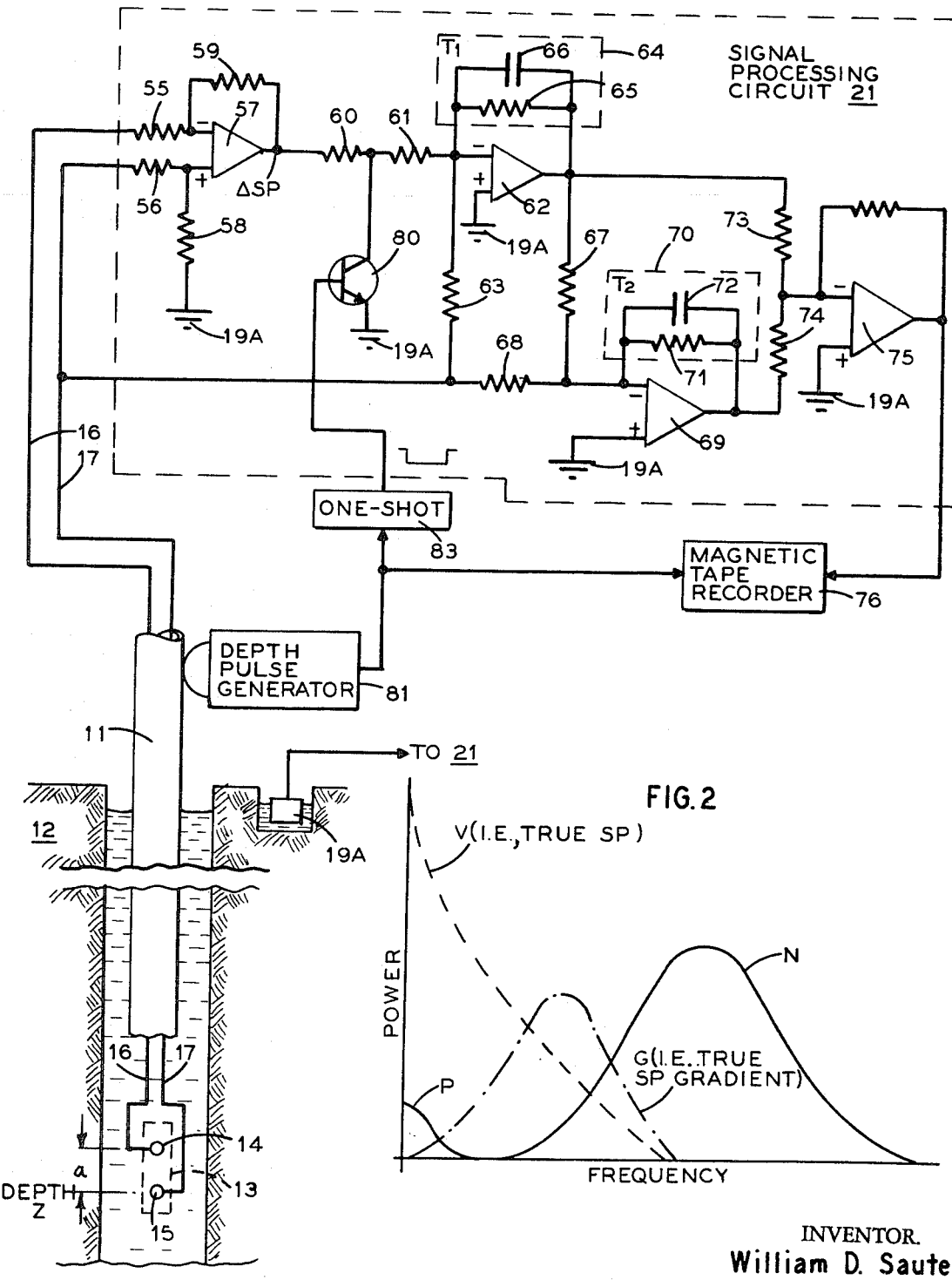
FIG. 1 is a schematic diagram of an embodiment of the present invention for converting a spatial derivative to a time derivative.
FIG. 2 is a graph of power versus frequency for various components of the signals produced in FIG. 1.

Referring now to FIG. 1, there is shown a borehole 10 filled with a suitable conductive drilling mud 11 traversing earth formations 12. An electrode array 13 having electrodes 14 and 15 vertically spaced apart from one another by a distance "a" are supported in the borehole 10 on the end of a multiconductor cable (not shown) for logging the spontaneous potential of the formation 12. A pair of conductors 16 and 17 connect the downhole electrodes 14 and 15 to the surface of the earth where the potentials picked up by the electrodes 14 and 15 are processed by a signal processing circuit 21 to produce indications of the spontaneous potentials of the adjoining earth formations 12.

Before discussing how the signal processing circuit 21 operates to produce an improved SP output signal, it would first be in order to discuss some theoretical considerations. The usual SP measurement is given by the difference between the potential at one of the downhole electrodes 14 or 15 and the potential at an electrode 19A immersed in a mud pit 20 at the surface of the earth. This usual SP measurement is subject to several types of noise as discussed earlier. This noise can be broken down into two categories, high frequency noise and low frequency noise. The high frequency noise, as discussed earlier, is caused by such things as telluric currents, bimetallism, drilling rig noise, etc., which generally have a period which is on the order of a few seconds or less. The DC or low frequency noise generally results from electrode polarization and is not usually troublesome as concerns this usual SP measurement because of the low magnitude of this polarization noise relative to the measured SP. However, as discussed earlier, the high frequency noise is usually troublesome as concerns the usual SP measurement. Therefore, the usual SP measurement can be designated $V + N$ where $V$ is the true SP signal (i.e., is equal to the potential measured between electrodes 15 and 19a if noise were absent) and $N$ is the high frequently noise component.

As set forth in the copending Schuster application, a gradient SP signal designated $\Delta SP$ is derived from the difference between the potentials at electrodes 14 and 15 and used by the signal processing circuit 21 in conjunction with the usual SP measurement to produce a compensated SP measurement. This $\Delta SP$ measurement is for the most part free of these AC or high frequency noise components. The reason for this is that AC type noise sources are generally non-local or remote relative to the electrodes 14 or 15 and thus will affect the potential on the electrodes 14 and 15 similarly. Thus, since the potential on one electrode is subtracted from the potential on the other electrode to produce the gradient signal, this AC type noise is usually canceled out.

The same is not true, however, for errors caused by polarization of the electrodes 14 and 15 since polarization is a local effect, i.e., it affects each electrode in an individual manner. As discussed earlier, the polarization noise is small relative to the total SP measurement such that it can for all practical purposes be ignored. However, since the $\Delta SP$ or gradient is the difference in potential between two closely spaced points in the borehole, this $\Delta SP$ or gradient signal will be relatively small in magnitude, thus rendering the polarization noise components important. Therefore, the gradient measurement contains both a true, noiseless gradient signal, designated "$G$", and polarization noise, designated "$P$." This output signal $\Delta SP$ is thus equal to $G + P$.

It can thus be seen that $\Delta SP$ contains valuable high frequency information but poor low frequency information because of the polarization error. The conventional SP measurement contains valuable low frequency information but poor high frequency information because of the high frequency noise $N$. This is better illustrated in FIG. 2 where there is shown a plot of power versus frequency for the above discussed signal components. It can be seen that true noiseless SP, represented as the dashed line curve $V$, has a large amount of power at low frequencies and rapidly decreases to very little power at higher frequencies. The true, noiseless gradient signal $G$, represented as the dash dot line curve, has very little low frequency power and a significant amount of intermediate or high frequency power. The polarization noise $P$, on the other hand, has a significant amount of low frequency power and rapidly diminishes to zero power as the frequency increases. The high frequency noise component $N$ has no power at low frequencies but a significant amount of power at high frequencies.

In accordance with the teachings of the earlier mentioned copending Schuster application, both the SP and $\Delta SP$ measurements are combined in the signal processing circuit 21 which operates to detect low frequency components of the SP measurement and high frequency components of a function of the $\Delta SP$ measurement and combine these two detected components to arrive at a compensated SP measurement.

The $\Delta SP$ gradient signal is given by the expression:

$$\Delta SP = G + P = V(z+a) - V(z) + P \approx a(dV/dz) + P \quad 1.$$

where $V(z)$ is the true SP at the depth level $z$ in the borehole, and $V(z + a)$ is the true SP at the depth level $z + a$ in the borehole. Since analog type circuits operate in the time domain, it would first be desirable to examine equation (1) written as a function of time. In this case, equation (1) becomes:

$$\Delta SP = a\,(dV/dt) \cdot (dt/dz) + P = a/u\, dV/dt + P \quad 2.$$

where $u$ is the velocity $(dz/dt)$ of the electrode array. In Laplace transform notation, equation (2) can be expressed as:

$$L(\Delta SP) = S\tau \bar{V}(z) + \bar{P} \quad 3.$$

where $$\tau = a/u \quad 4.$$

The expression for the signal at conductor 17 is:

$$SP = V(z) - V_o + N \quad 5.$$

where $V_o$ is the voltage on the SP surface electrode 19a. Since $V_o$ would ordinarily be 0 volts except for the effect of the noise component $N$, equation (5) can be rewritten as:

$$SP = V(z) + N \quad 6.$$

The Laplace transform for equation (6) is:

$$L(SP) = \bar{V}(z) + \bar{N} \quad 7.$$

$\bar{V}(z)$ will hereafter be referred to simply as $\bar{V}$.

Since the desired $V$ term has maximum information content at low frequency and the undesired noise term $N$ has maximum power at high frequencies, it is clear that these two terms, $V$ and $N$, should be passed at low frequencies only. On the other hand, since the desired gradient term $G$ has maximum power at mid or high frequencies and the undesired noise term $P$ has maximum power at low frequencies, it is clear that these two terms, $G$ and $P$, should be passed at high frequencies only. Therefore, the expression for the output signal $e_o$ from the signal processing circuit 21 should desirably be:

$$\tilde{e}_o = L(\tilde{V} + \tilde{N}) + H(S\tau\tilde{V} + \tilde{P}) \qquad 8$$

or $$\tilde{e}_o = (L + S\tau H)\tilde{V} + L\tilde{N} + H\tilde{P} \qquad 9$$

where $L$ and $H$ are low and high frequency transfer functions respectively.

From equation (9), the condition for faithfully reproducing the true SP term $V$ is:

$$L + S\tau H = 1 \qquad 10.$$

In the copending Schuster application, it was shown that desirable results are obtainable if the expressions for L and H are:

$$L = \frac{1 + S(T_1 + T_2)}{(1 + ST_1)(1 + ST_2)} \qquad (11)$$

and $$H = KST_2/(1 + ST_1)(1 + ST_2) \qquad 12$$

where $K$ is a gain function applied to the gradient signal and $T_1$ and $T_2$ are time constants. Equation (11) will be recognized as the Laplace expression for a low pass filter and equation (12) will be recognized as the Laplace expression for a band pass filter. For a more detailed explanation of these filters, see the copending Schuster application.

From equations (11) and (12), the expression $L + S\tau H$ from equation (9) can be written as:

$$L + S\tau H = \frac{1 + S(T_1 + T_2) + S^2 K\tau T_2}{(1 + ST_1)(1 + ST_2)} \qquad (13)$$

Figure 3:
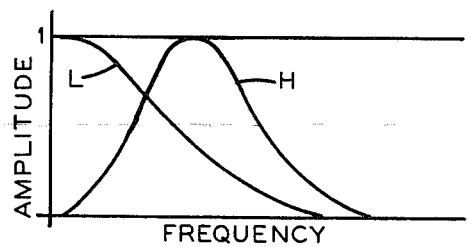
FIG. 3 is an amplitude versus frequency plot for certain circuits of FIG. 1.

Turning now to FIG. 3, there is shown a plot of amplitude versus frequency for the transfer functions $L$ and $H$ from equations (11) and (12) respectively. From FIG. 3, it can be seen that the low frequency transfer function $L$ describes a low pass filter while the transfer function $H$ describes a band pass filter.

It can be seen that equation (13) contains a term $K\tau$ where $\tau$ was earlier defined as being equal to $a/u$ where $a$ is the spacing between electrodes 14 and 15 and $u$ is the velocity of tool 13 moving through the borehole. It can further more be seen from equation (13) that if $K\tau$ is made equal to $T_1$, then the numerator portion of equation (13) is equal to the denominator portion thereof such that $L + S\tau H$ is equal to 1, thereby assuming faithful reproduction of the SP in accordance with the requirements of equation (10). Since $\tau$ is equal to $a/u$, the condition $K\tau$ equals $T_1$ implies the condition that $K$ equals $T_1 u/a$. "$T_1$" and "$a$" being constants, $K$ must vary with the velocity $u$. It is this variation of $K$ with $u$ that brings about the conversion of the spatial derivative $\Delta SP$ signal to a time derivative signal.

Now returning to FIG. 1, a filter circuit having the transfer characteristics given by equations (11), (12) and (13) will be described. The conductors 16 and 17 from the electrodes 14 and 15 respectively are connected through input resistors 55 and 56 respectively to the positive and negative inputs respectively of an operational amplifier 57 such that the output signal therefrom will be proportional to $\Delta SP$. The positive input terminal of amplifier 57 is connected via a resistor 58 to surface reference electrode 19a and a feedback resistor 59 is connected from the output of amplifier 57 to the negative input thereof. The output signal from amplifier 57 is supplied through a pair of resistors 60 and 61 having a total resistance r to the negative input of an operational amplifier 62.

The lower SP electrode 15 potential on conductor 17 is supplied via an input resistor 63 to the negative input of operational amplifier 62. A feedback circuit 64 including a resistor 65 and capacitor 66 is connected from the output of amplifier 62 to the negative input terminal thereof. The capacitor 66 and resistor 65 have a time constant $T_1$. The output signal from amplifier 62 and the SP potential on conductor 17 are summed at the negative input terminal of operational amplifier 69 by way of a pair of input resistors 67 and 68 respectively. The positive input terminals of amplifiers 62 and 69 are connected to the surface reference electrode 19a such that the SP potential on conductor 17 will effectively be referenced to the reference potential of surface electrode 19a. The amplifier 69 has a feedback circuit comprising a resistor 71 and capacitor 72 which have a time constant $T_2$.

The output signals from amplifiers 62 and 69 are summed via a pair of resistors 73 and 74 at the negative input terminal of an operational amplifier 75. The output signal from this operational amplifier 75 comprises the compensated SP output signal which is applied to a recorder, in this case a magnetic tape recorder 76, for recording as a function of borehole depth.

To convert the spatial derivative signal $dV/dZ$ to a time derivative signal $dV/dt$ in accordance with the present invention, a switching transistor 80 connects the junction point between the resistors 60 and 61 to ground at periodic time intervals determined by the velocity of the cable. To sense this cable velocity, a suitable depth pulse generator 81, which includes a rotating wheel 82 in engagement with the cable, generates a pulse for each given incremental movement of the cable. If desired, these pulses could be corrected for cable stretch, temperature and the like as shown in U.S. Pat. No. 3,497,958 granted L. H. Gollwitzer on Mar. 3, 1970. These pulses are utilized to energize a fixed time period one-shot 83 which operates to turn the transistor 80 on and off with a repetition rate proportional to cable velocity.

Figure 4A:
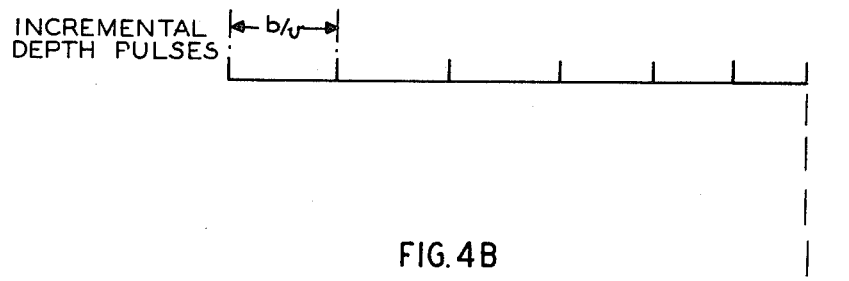
FIGS. 4A and 4B are timing diagrams representing the operation of a portion of the FIG. 1 circuitry.
Figure 4B:

Turning now to FIGS. 4A and 4B, there are shown the waveform diagrams of the incremental depth pulses from generator 81 and the timing pulses generated by one-shot 83. As seen in FIG. 4A, the incremental depth pulses can vary in frequency depending on the velocity of the cable. However, the timing pulses from one-shot 83, which are generated in response to each incremental depth pulse have a fixed time duration $T_s$. These timing pulses turn off the transistor 80 to thus remove ground potential from the junction point between resistors 60 and 61. By so doing, the average value of current supplied from amplifier 57 to amplifier 62 will vary in proportion to the velocity of the cable.

If the depth pulse generator 81 produces a pulse for each "b" inches of cable movement, then the time interval between successive incremental depth pulses will be $b/u$, where u is the cable velocity. Since the total resistance value of resistors 60 and 61 is $r$, the expression for the average current supplied to the amplifier 62 will be:

$$I_{avg} = \frac{\Delta SP}{r} \cdot \frac{T_s}{\frac{b}{u}} \quad (14)$$

or $$I_{avg} = \Delta SP\, uT_s/br \quad 15.$$

If the resistance value of resistor 65 is $R$, then the DC gain of amplifier 62, which gain is by definition equal to $K$, is:

$$\text{DC Gain of Amp } 62 = K = \frac{R}{\frac{br}{uT_s}} = \frac{RuT_s}{br} \quad (16)$$

Since, in equation (16), $R$, $T_s$, $b$ and $r$ are constants, it can be seen that the gain $K$ will vary as a function of $u$ only.

It should also be mentioned at this point that an SP current measurement could be utilized to obtain the gradient signal instead of using the two closely spaced electrodes. In this case, the SP current measurement would yield:

$$I_{SP} = (dV/dz)\, \sigma_m A \quad 17$$

where $\sigma_m$ is the conductivity of the borehole fluid and $A$ is the area of borehole fluid passing through the current measuring toroid. Since $\sigma_m A$ can be considered as a constant, the measurement is proportional to $dV/dz$, the same as when using the two electrode configuration. Thus, this spatial derivative should desirably be converted to a time derivative if circuits having time dependent characteristics are to be used.

It can thus be seen from the foregoing that new methods and apparatus have been set forth for converting a spatial derivative signal to a time derivative signal. This has been accomplished by utilizing incremental depth pulses derived from an incremental depth pulse generator of the type commonly found in well logging. Usually, such incremental depth pulse generators are used to supply depth information to stepping-type magnetic tape recorders commonly used for recording well logging data. It is very convenient to be able to use these same incremental depth pulses for the conversion process of the present invention.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. Apparatus for converting a spatial derivative well logging measurement to a time derivative measurement comprising:
   a. a support member adapted for movement through a borehole;
   b. means carried by said support member and adapted for measuring the spatial derivative of a subsurface characteristic to enable a spatial derivative signal to be produced;
   c. a cable for supporting said support member in a borehole;
   d. means responsive to the movement of said cable for generating depth pulses having a time characteristic dependent on the velocity of said cable; and
   e. converting means responsive to said depth pulses for converting said spatial derivative signal to a time derivative signal.

2. The apparatus of claim 1 wherein said converting means includes variable gain means responsive to said depth pulses for varying the effective gain as a function of the rate of said depth pulses, and means for applying said spatial derivative signal to said variable gain means to produce said time derivative signal.

3. The apparatus of claim 1 wherein said converting means includes first and second impedance means connected in series, means for applying said spatial derivative signal to one side of said series connected impedance means, amplifying means having an input terminal connected to the other side of said series connected impedance means, switch means responsive to said depth pulses for repetitively applying a given potential to the junction point between said series connected impedance means to thereby vary the effective gain of said amplifying means to said spatial gradient signal as a function of said time characteristic of said depth pulses.

4. Apparatus for investigating the spontaneous potential of earth formations traversed by a borehole, comprising:
   a. a cable adapted to be lowered in a borehole;
   b. means supported by said cable for movement through the borehole and adapted for deriving a measure of the potential spatial derivative in the borehole to produce a first measurement;
   c. means for deriving a measure of the difference between the potentials at a location in the vicinity of said gradient measuring means and a relatively remote point to produce a second measurement;
   d. means responsive to the movement of said cable for generating depth pulses having a time characteristic dependent on the velocity of said cable;
   e. converting means responsive to said depth pulses for converting said spatial derivative measurement to a time derivative one; and
   f. combining means for combining said converted first measurement and second measurement to produce a compensated measure of the spontaneous potential.

5. In apparatus for investigating a subsurface characteristic by lowering a spatial derivative measuring device on a cable in a borehole in the earth, apparatus for converting the spatial derivative well logging measurement to a time derivative measurement comprising:
   a. means for producing a signal representative of the spatial derivative of the subsurface characteristic;
   b. means adapted to be responsive to the movement of a cable for generating depth pulses having a time characteristic dependent on cable velocity; and c. converting means responsive to said depth pulses for converting said spatial derivative signal to a time derivative signal.

6. A method of converting a spatial derivative well logging measurement to a time derivative measurement comprising:
   a. carrying a measuring apparatus through a borehole, said apparatus adapted for measuring the spatial derivative of a subsurface characteristic to enable a spatial derivative signal to be produced;
   b. generating depth pulses having a time characteristic dependent at least in part on the velocity of the measuring apparatus; and
   c. using said depth pulses to convert said spatial derivative signal to a time derivative signal.

* * * * *